United States Patent [19]
Hudkins

[11] Patent Number: 5,885,515
[45] Date of Patent: Mar. 23, 1999

[54] BLOW MOLDING PROCESS

[75] Inventor: Patrick E. Hudkins, Carlisle, Pa.

[73] Assignee: Lear Corporation, Southfield, Mich.

[21] Appl. No.: 812,210

[22] Filed: Mar. 6, 1997

[51] Int. Cl.⁶ .................................................. B29C 49/20
[52] U.S. Cl. ........................................ 264/516; 264/515
[58] Field of Search ..................................... 264/515, 516

[56] References Cited

U.S. PATENT DOCUMENTS

| | | | |
|---|---|---|---|
| 4,289,817 | 9/1981 | Valyi | 428/35 |
| 4,563,374 | 1/1986 | Treber et al. | 428/31 |
| 4,857,258 | 8/1989 | Le Doux et al. | 264/515 |
| 5,020,687 | 6/1991 | Seizert | 220/645 |
| 5,040,335 | 8/1991 | Grimes | 49/502 |
| 5,044,663 | 9/1991 | Seizert | 280/730 |
| 5,114,522 | 5/1992 | Takado et al. | 156/245 |
| 5,123,688 | 6/1992 | Takado et al. | 293/120 |
| 5,162,092 | 11/1992 | Klobucar et al. | 264/513 |
| 5,169,470 | 12/1992 | Goldberg | 156/244.14 |
| 5,194,212 | 3/1993 | Bonnett | 264/515 |

FOREIGN PATENT DOCUMENTS

| | | | |
|---|---|---|---|
| 60-262633 | 12/1985 | Japan | 264/516 |
| 61-227017 | 10/1986 | Japan | 264/516 |
| 62-4057 | 1/1987 | Japan | 264/515 |
| 2047034 | 2/1990 | Japan . | |
| 3069335 | 3/1991 | Japan . | |
| WO9412334 | 6/1994 | WIPO . | |
| WO9513938 | 5/1995 | WIPO . | |

OTHER PUBLICATIONS

Seibolt Hettinga, *Single Step Multifunction Molding—A Design for World Competition, SAE Technical Paper Series 910524*, Hettinga Technologies, Inc.

Seibolt Hettinga, *Combining Materials and Functions for Low Cost Manufacturing of Headliners, SAE Technical Paper Series 930309*, Hettinga Technologies, Inc.

*Low–Pressure Molding Puzzle*, Plastics Technology, Dec. 1993.

Peter Mapleston, *Low–pressure process simplifies part decoration*, Modern Plastics, Apr. 1993.

E. Gail, *Processing Technology Steers New Automotive Applications*, Plastics Design Forum, Jul./Aug. 1992.

Dr. Siebolt Hettinga, *How low–pressure injection differs from conventional molding*, Modern Plastics, Jun. 1992.

C. Lodge, *New Lable Materials Boost In–Mould Appeal*, Plastics World, May 1989.

William R. LaFollette, *An Examination of the Various Decorating Methods in Use for Plastic Bottles and Their Impact on the Ability to Reprocess the Resin the Bottles are Made Of, Conference*, Dow Chemical Company, Atlanta, GA, Oct. 7–9, 1991.

*Primary Examiner*—Jan H. Silbaugh
*Attorney, Agent, or Firm*—Wood, Herron & Evans, L.L.P.

[57] ABSTRACT

A process which combines the technologies of extrusion blow molding to form a shaped article and subsequently forming and attaching a textile to the contoured outer surface of the article.

9 Claims, 7 Drawing Sheets

BLOW MOLDING PROCESS

FIELD OF THE INVENTION

1. Field of the Invention

The present invention relates to a low pressure molding method of making an article comprising a plastic substrate and a textile secured thereto using technologies developed from thermo-lamination, pressure assisted thermoforming, injection molding and compression molding processes.

2. Description of the Prior Art

In accordance with the prior art, the presentation of the plasticizer materials used as a substrate in low pressure molding techniques inherently limits the geometric shapes that can be formed. The prior art processes produce finished articles formed from components that can be termed "three dimensional" but which are actually contoured shapes comprising multiple layers, each of which has a flat profile.

The "low pressure technology," also referred to as "back compression molding," consists of at least three different processing versions: the rope-depositing process, the laminar flow process and a pre-form method also referred to as the Krauss-Maffei (KM) method.

In the rope-depositing method, a movable extruder or plasticator unit travels across the open mold extruding and depositing a rope of melt directly on the lower mold surface. This melt rope should be deposited following the contours of the mold, if possible, in order to keep the flow paths as short as possible. Assuming a flow can be induced, this process works satisfactorily at surprisingly low temperatures. The textile material, known as the "decorative material," is thus subjected to low pressure loading ranging from 300 PSI to 2000 PSI.

The laminar flow method, also known as the "back-injection" technique is based on maintaining a solid melt front by injecting a plasticated, uniform melt at low pressures. The pressures developed in the low pressure injection mold process are typically from 300 PSI to 1400 PSI as compared with normally higher injection molding pressures ranging from 3500 PSI to 10,000 PSI. In the low pressure process, a decorative material is secured over one mold half. A plasticated resin is injected behind (atop) the decorative material which in turn forms the textile into the mold cavity. The molten resin also serves as a bonding agent by mechanically coupling itself to the textile as the resin solidifies.

The KM pre-form method utilizes a pre-form produced through an extrusion or auxiliary plasticating equipment. The plasticating unit fills a mold cavity with resin melt volumetrically. The mold is opened and the top half of the master mold, complete with inserted and positioned textile, moves into working position. The pre-form remains in the bottom half of the mold. Both halves are then pressed together without air inclusions, thus giving the materials their final shape. Pressures required for this process range from 150 PSI to 2000 PSI and sometimes more.

Other objects and features as well as additional details of the present invention will become apparent from the following detailed description and annexed drawings of the presently preferred embodiments thereof, when considered in conjunction with the associated drawings.

SUMMARY OF THE INVENTION

The technology used in the present invention is based upon processing principles from the extrusion/blow molding manufacturing field. Prior to the actual blow molding cycle, a textile is placed across one mold half or both mold halves thereby covering both mold cavities. In the blow-molding aspect of the process, the plasticated material is formed into a parison through a die and then, utilizing known techniques, is inflated to fill the mold cavities. When the inflated parison comes in contact with the textile, the forces applied to the internal surfaces of the parison then expand the plasticated material into the mold, which in turn forces the textile to conform to the shapes of the mold cavity or cavities. This process requires much lower forming pressures, i.e., 10 PSI to 120 PSI, from those found in the prior art. These lower pressures are critical in order to assure that the decorative, insulation and acoustical qualities of the textile are retained.

Also, the "textile in" blow mold process can decorate, partially or entirely, one side of a hollow component or partially or entirely both sides of a hollow component. This flexibility of decorating both sides of a component provides another feature by which one can separate the component into two pieces thereby doubling the throughput of the machine and associated molds.

Another advantage of the present invention over the prior art is the complexity of the part geometry that can be produced. The prior art low pressure methods work satisfactorily with simple geometry, but it is not well suited for fabrication of parts which require the decorative treatment to extend beyond the edges in excess of 90 degrees; whereas, the extrutsion blow mold process of the present invention can be used to decorate both sides of the part and can be extended to treatment of undercut areas through the use of known and currently practiced tooling technologies.

DESCRIPTION OF THE PREFERRED EMBODIMENTS

The process of the present invention facilitates the manufacture of articles having a thermoplastic base while forming and adhering a decorative textile to the surface of the thermoplastic.

Figure 1:
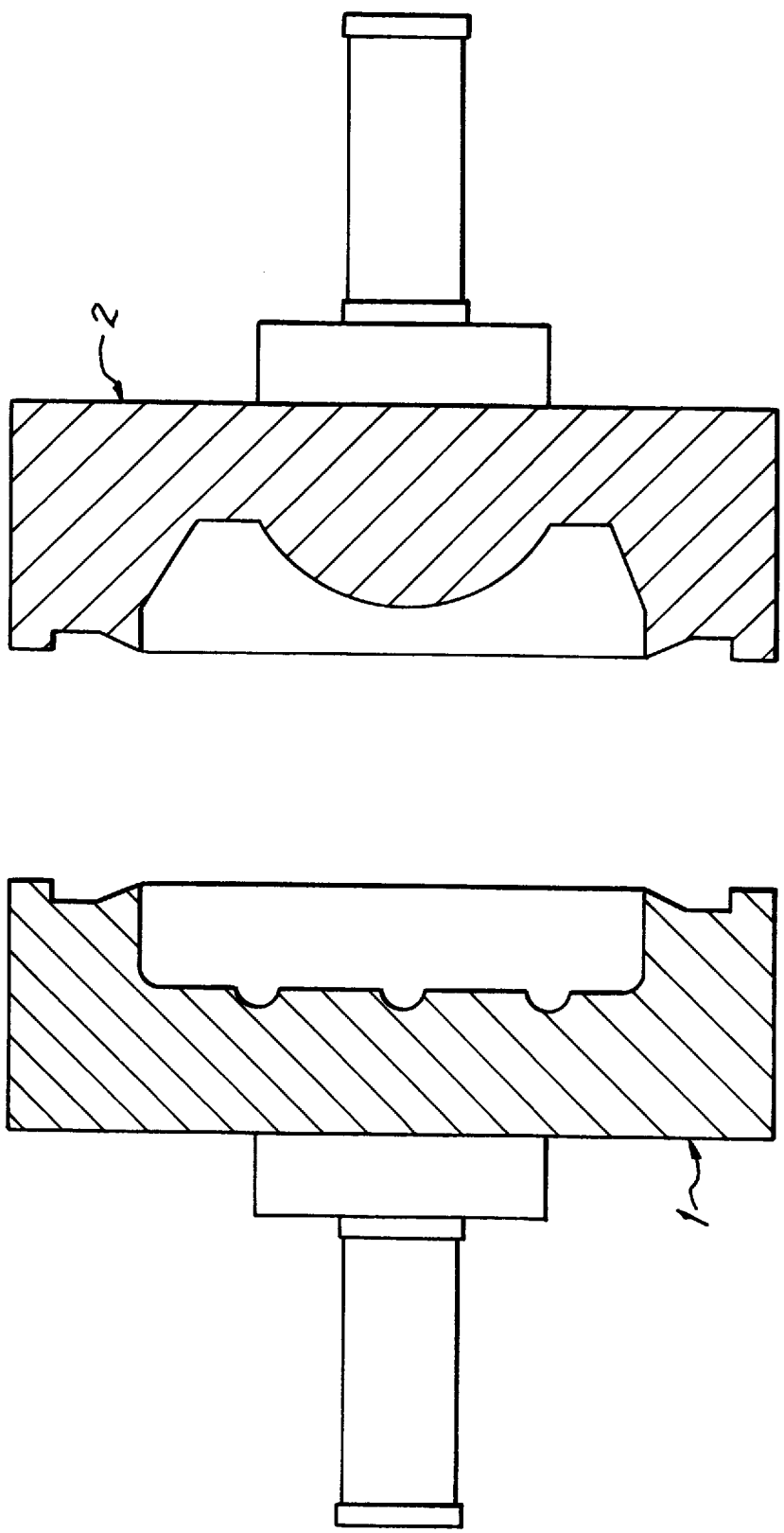
FIG. 1 is a plan view depicting the mold halves (1,2) as they are configured in the molding press just prior to the placement of the textile therein.

Referring to FIG. 1 a plan view is depicted having mold halves (1,2) as they are configured in the molding press just prior to the placement of a textile element therein.

Figure 2:
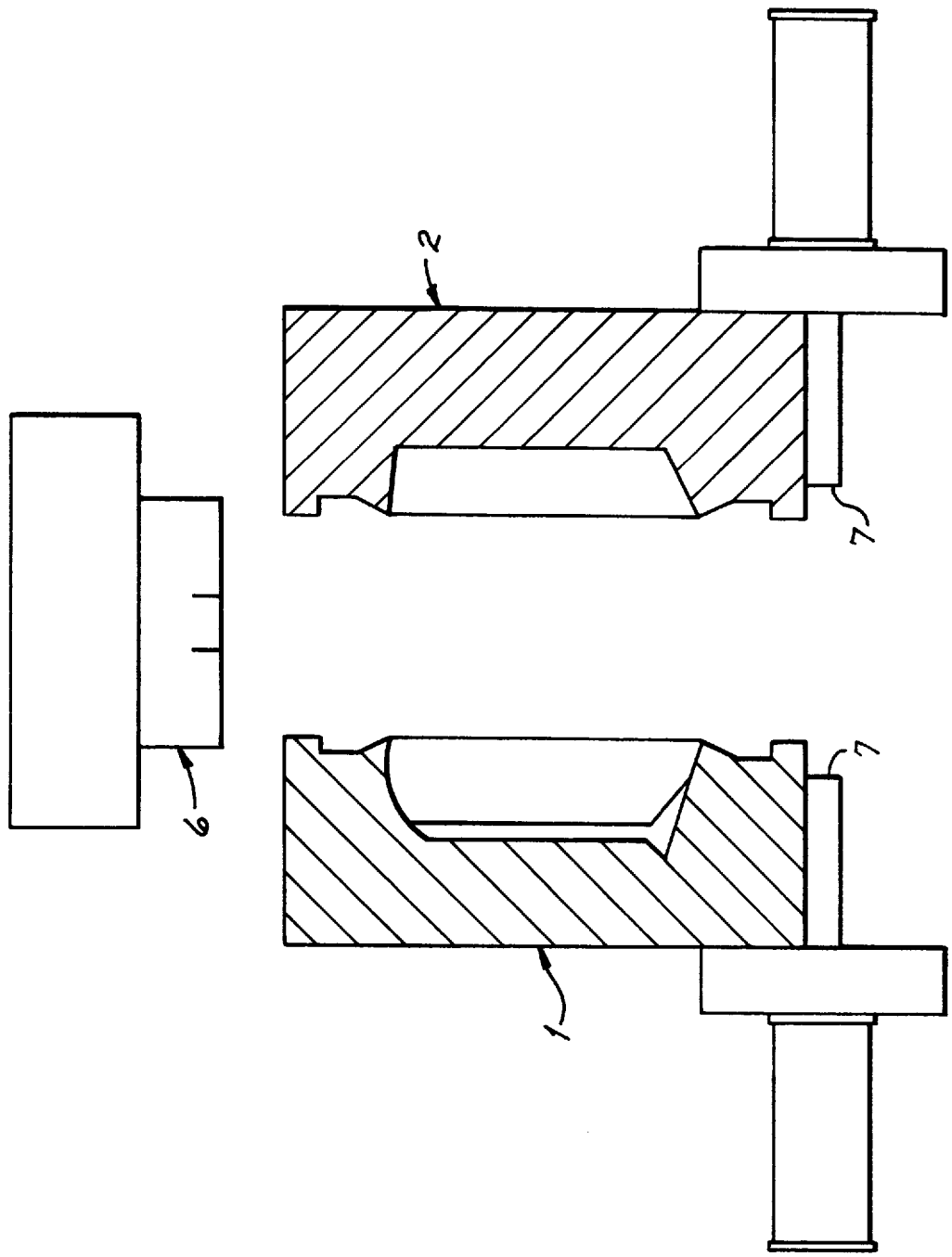
FIG. 2 is a side view depicting the relative relationship of the plasticator die (6) the mold halves, (1,2) and pinch-off device (7) as they are configured in the molding machine just prior to the placement of the textile therein.

Referring also to FIG. 2, a side view is depicted illustrating the relative relationship of the plasticator die (6), the mold halves, (1,2) and pinch-off device (7) as they are configured in the molding machine just prior to the placement of a textile element (not shown) therein.

As illustrated, a temperature controlled mold comprising at least two halves (1,2) is utilized. The mold halves are mounted in such a manner as to allow the mold halves to move in a horizontal plane within a clamping mechanism or press. FIGS. 1 and 2 depict mold halves (1, 2) as they are configured in the press just prior to placement of a textile element therein (not shown).

Figure 3:
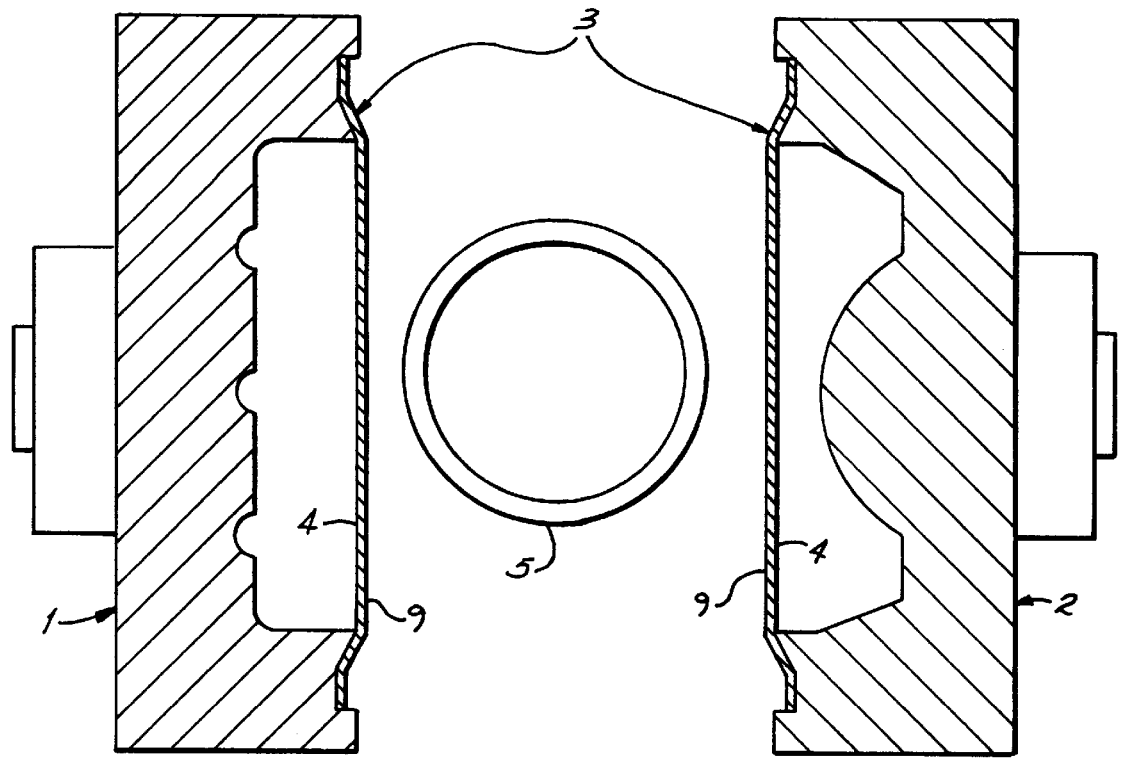
FIG. 3 is a plan view depicting the relationship of the parison, (5) mold halves (1,2) with the textile (3) properly oriented with the face surface (4) and backing (9) fixed in position over the cavities of the mold.

FIG. 3 depicts the relationship of a parison, (5), mold halves (1,2) with textile elements (3) properly oriented with the face surface (4) and backing (9) fixed in position over the cavities of mold halves (1,2). Textile elements (3) are cut to the proper detentions and fixed in place over each cavity of the mold half The textile face surface (4) is placed appropriately to facilitate a finished composite with the desired ornamental effect. For the purpose of the present invention, a "parison" is a hollow plastic tube from which a product, such as a container, is blow molded.

The formation of the parison and control of its physical characteristics can be accomplished by any of the known current techniques. In FIG. 3, parison (5) is shown in a vertical manner from a die (6) of required size and configuration.

Figure 4:
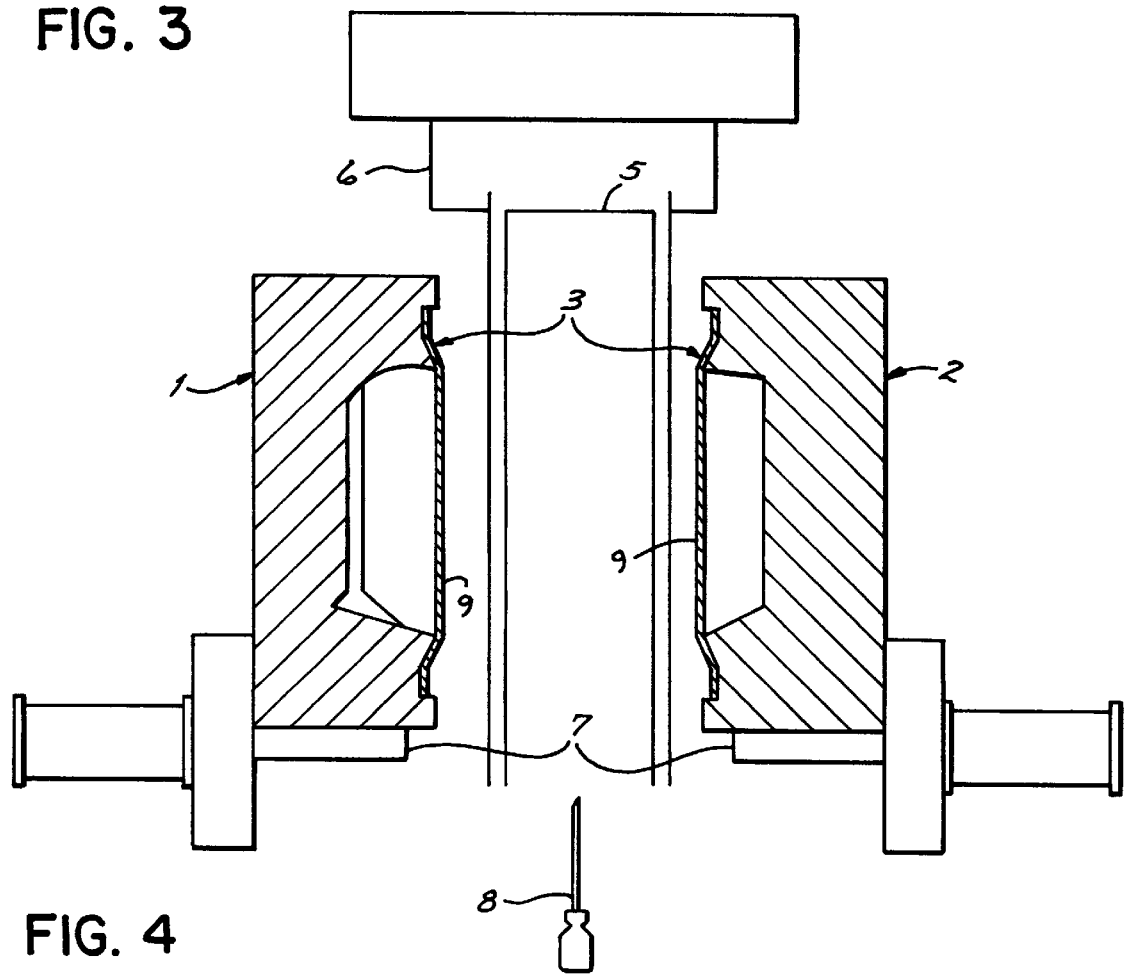
FIG. 4 is a side view depicting the relationship of the plasticator die (6) and the parison (5) to the mold halves (1,2) with the properly oriented textile (3) with backing (9) presented toward parison (5) and fixed in position over the cavities of the mold.

FIG. 4 depicts the relationship of plasticator die (6), pinch-off device (7), parison (5), blow pin (8) to mold halves (1,2) with properly oriented textile elements (3) with its backside (9) and face surface (4) fixed in appropriate position over the cavities of the mold.

Figure 5:
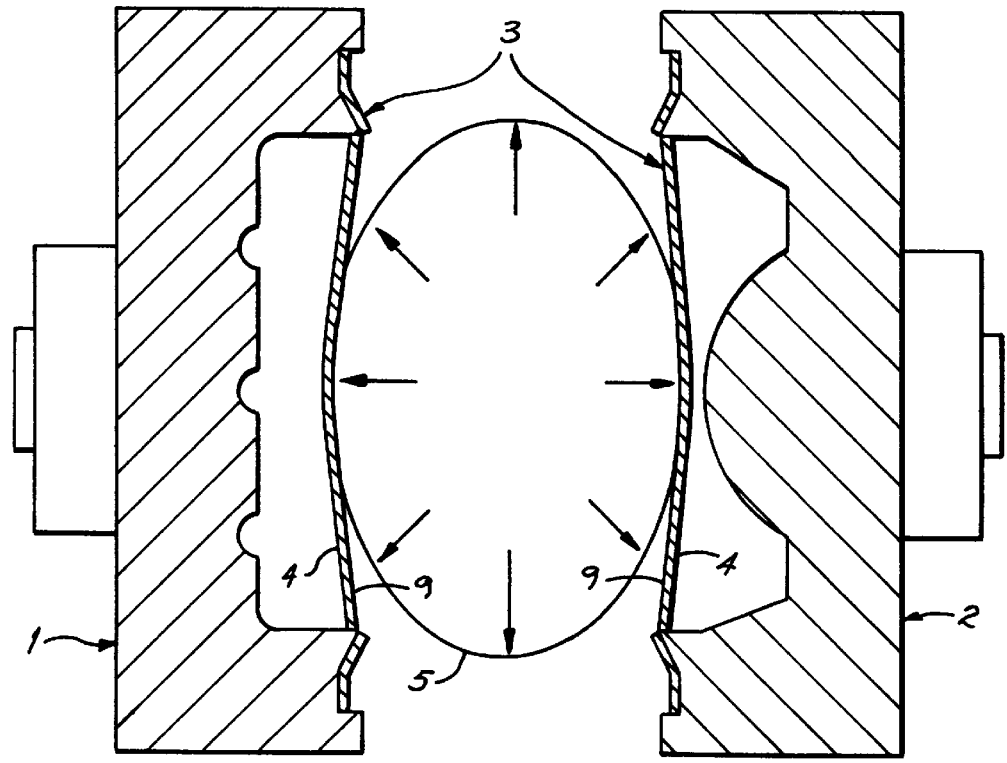
FIG. 5 is a plan view depicting the phase of the process known as "pre-blow" with a malleable slightly inflated parison (5) which overlays the backside surface area (9) of textile (3).
Figure 6:
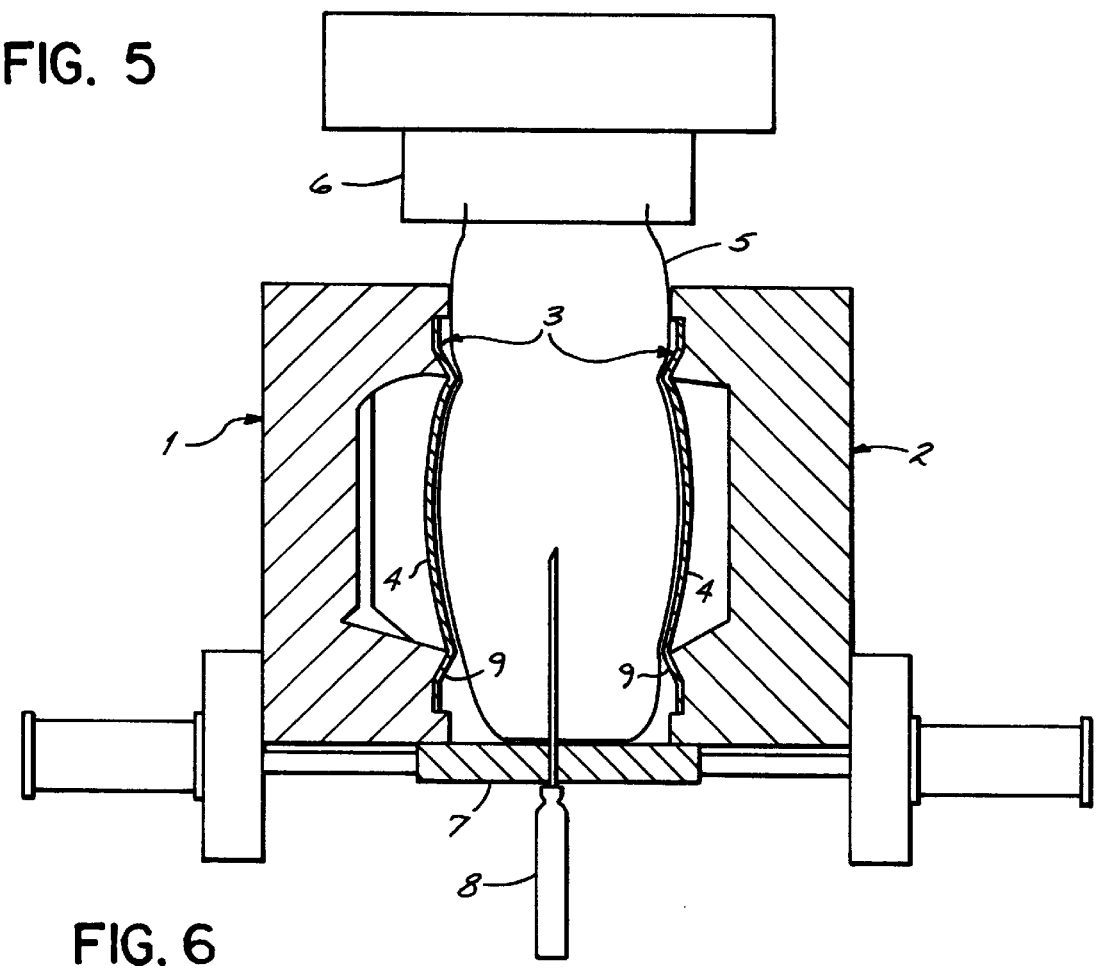
FIG. 6 is a side view depicting the relationship of die (6) mold halves (1,2) with attached textile (3) and its associated surfaces (4,9), pinch-off device (7) and inserted blow pin (8) used during the "pre-blow" phase of the process.

Pinch-off device (7) and blow pin (8) are activated using the usual control devices. Once the pinch-off at the open end of the parison is completed, and blow-pin(8) is in place, as depicted in FIGS. 5 and 6, a predetermined amount of low pressure air is injected through blow-pin (8). This injection of low pressure air into the closed confines of the molten parison and now causes the walls of parison (5) to expand outwardly toward mold halves (1,2) and associated textile elements (3) which are fixed in place.

Figure 7:
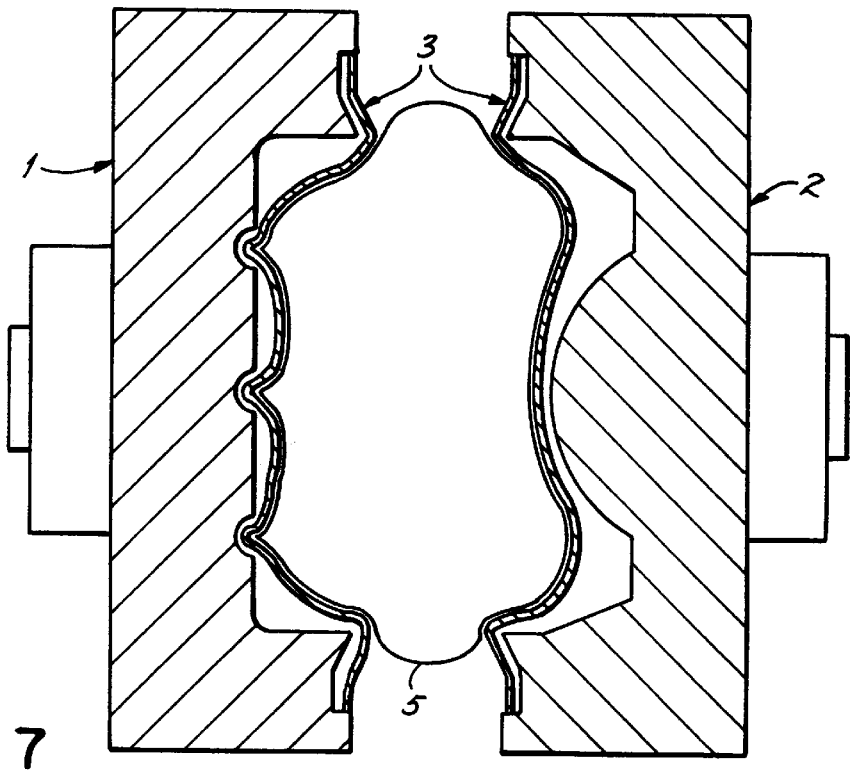
FIG. 7 is a plan view depicting the "pre-heat" phase of the process; mold halves (1,2) converge increasing forces of the molten thermoplastic parison (5) against the backside surface of textile (3).
Figure 8:
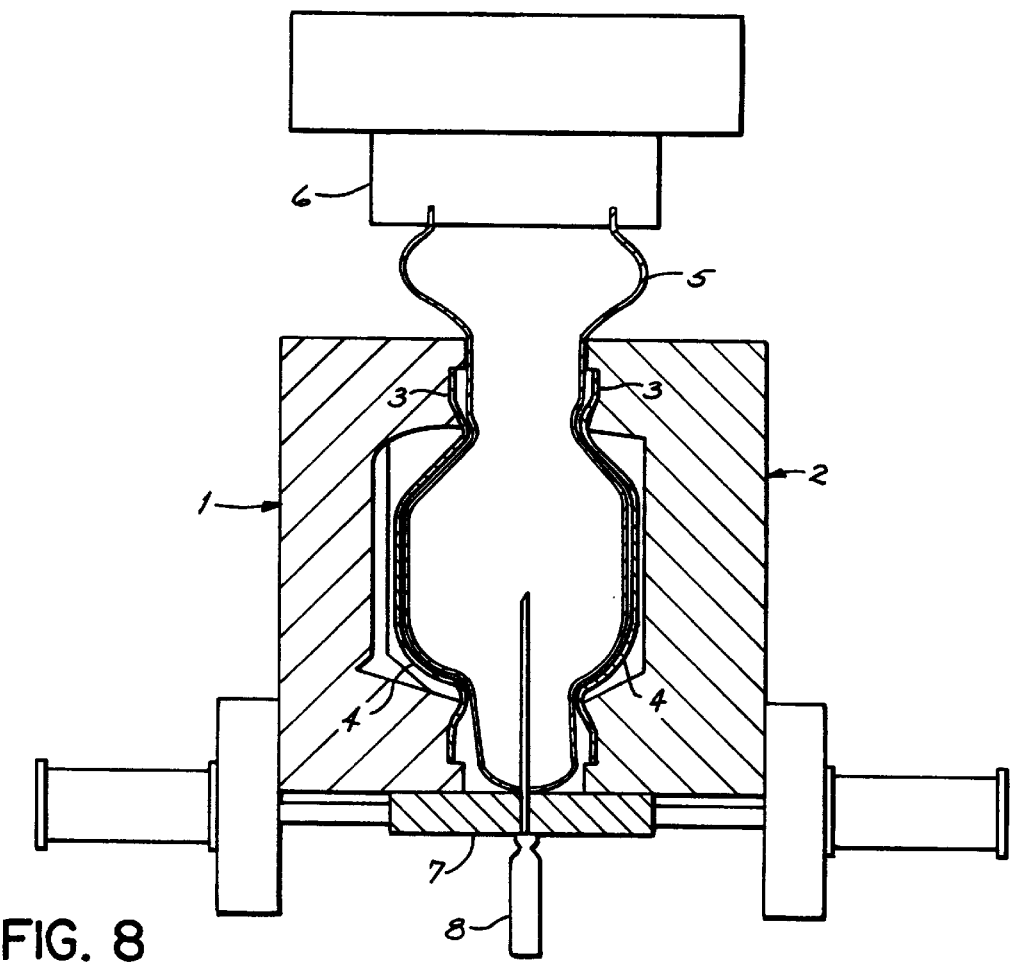
FIG. 8 is a side view depicting the "textile pre-heat" phase of the process along with the positions of the relative mechanical hardware pinch-off device (7) and blow-pin (8).

Simultaneously, as the molten parison makes contact with textile (3), the mold clamping device is activated and mold halves (1,2) move inward, converging toward each other. FIGS. 7 and 8 describe this. FIG. 7 depicts the "pre-heat" phase of the process wherein mold halves (1,2) are moved inward, converging towards each other, thereby increasing the forces of molten thermoplastic parison (5) against the backside surface of textile (3). When the backside of textile (3) is adequately covered by the molten thermoplastic of the parison, the movement of the mold halves is stopped. When the backside of the textile elements are adequately blanketed with the molten thermoplastic parison (5), the movement of the mold halves is stopped. At this phase, the transfer of heat from the molten parison to the textile (3), is allowed to take place. FIG. 8 depicts the "textile pre-heat" phase of the process along with the positions of the relative mechanical hardware pinch-off device (7) and blow-pin (8).

With the molten thermoplastic now in contact with the backside (9) of textile (3), a transfer of heat from the parison to the textile is allowed to take place. This heat transfer softens the fibers of the textile which in turn softens the textile making it moldable and malleable. Concurrently, the heat loss to textile (3) allows a cooling of the outer surface of the thermoplastic parison which in turn increases the viscosity of the molten thermoplastic parison (5). At the appropriate time, the mold halves are again activated and move inward to the closed position. Allowing time for the adequate heat transfer to continue, air pressure is then again injected through blow-pin (8 ) thus forcing the still moldable thermoplastic to push the now heated textile against the temperature controlled mold cavities thereby forming the textile and the parison to the shapes of the mold. This stage of the process is depicted in FIGS. 9 and 10.

Figure 9:
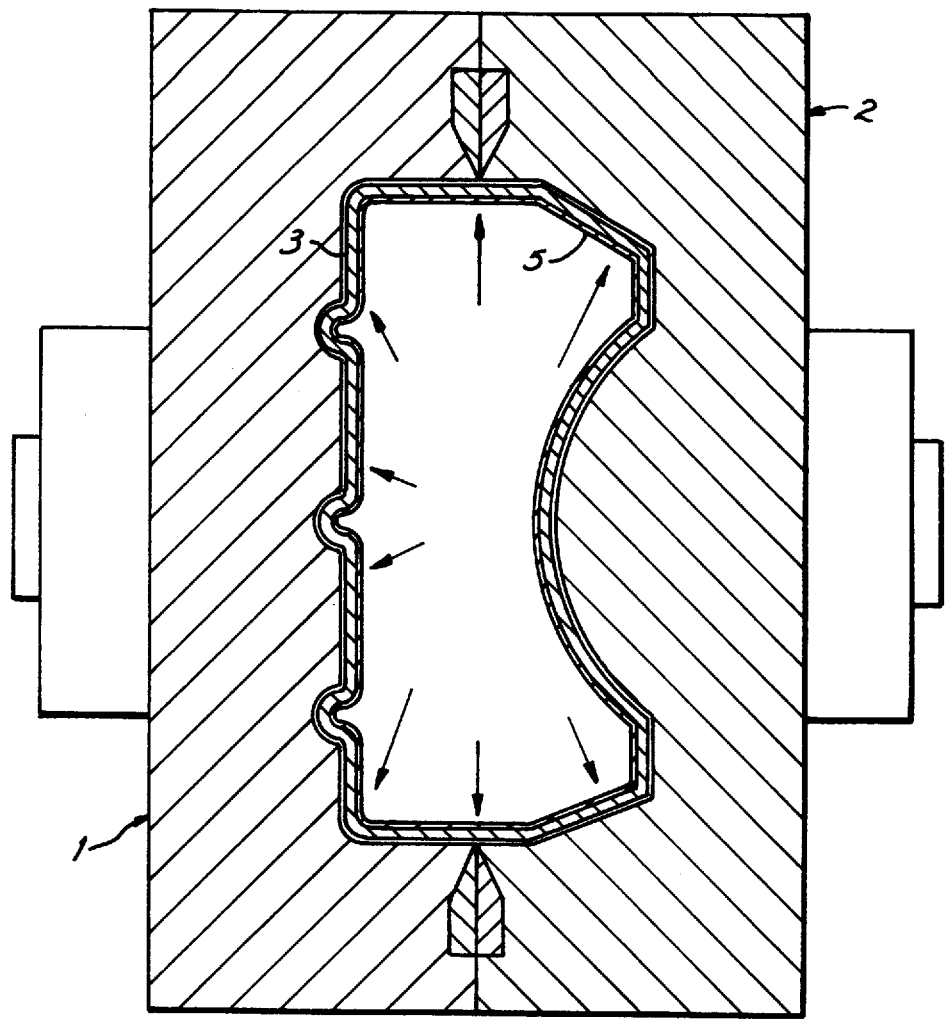
FIG. 9 is a plan view of mold halves (1,2) at their fully closed positions when required air pressure is applied forming textile (3) and parison (5) to the shapes of the mold cavity
Figure 10:
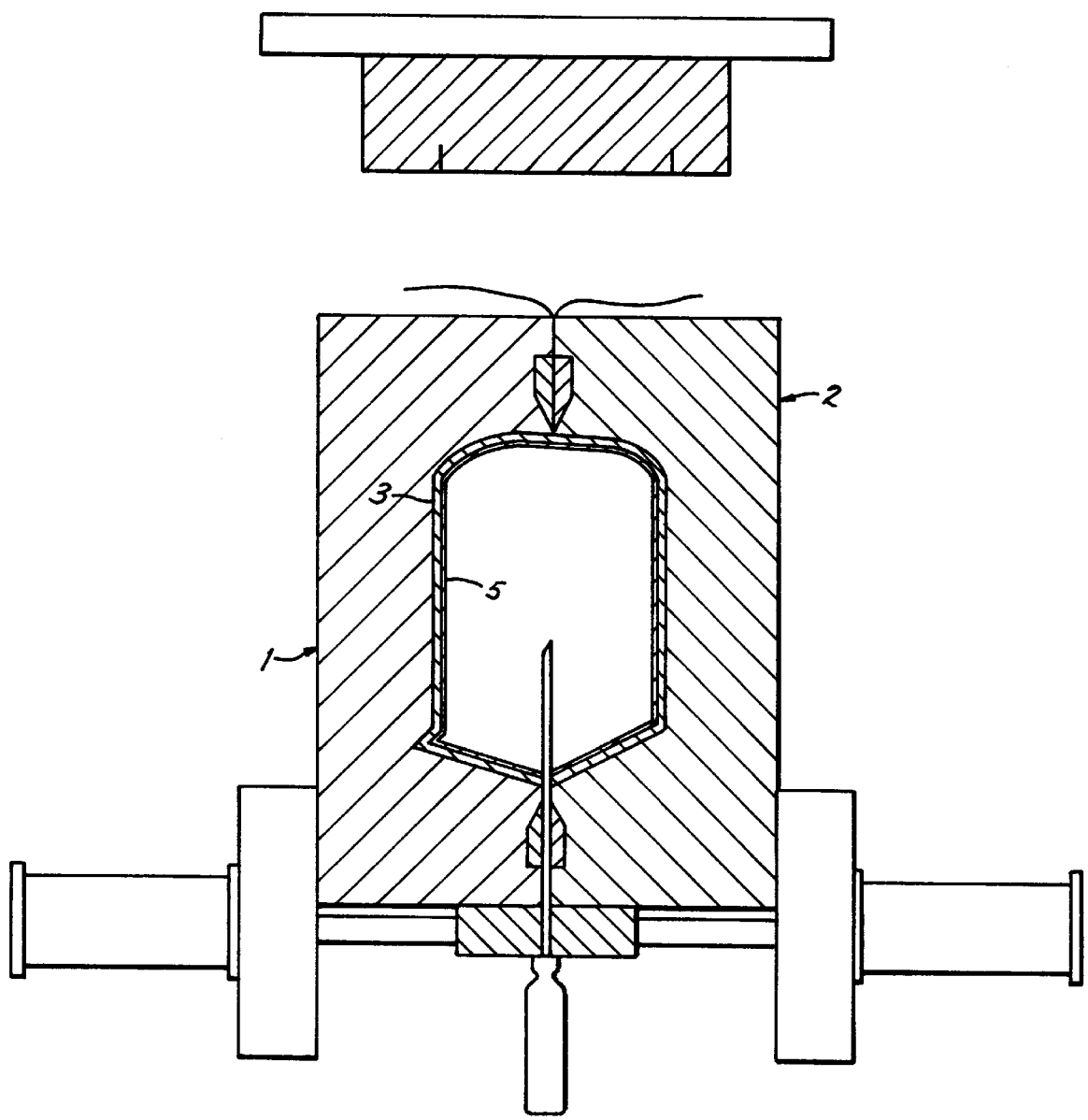
FIG. 10 is a side view of mold halves (1,2) at their fully closed position when the required air pressure is applied forming textile (3) and parison (5) to conform to the shapes of the molds.

FIG. 9 depicts mold halves (1,2) at their fully closed positions and at such time that the required air pressure is being applied thereby forming textile (3) and parison (5) to the shapes of the mold cavities. FIG. 10 depicts mold halves (1,2) at their fully closed position and at such time that the required air pressure is applied thereby forming textile (3) and parison (5) to the shapes of the molds.

The increased viscosity of the surface of the parison, which is in contact with the textile, retards the flow of the thermoplastic so as not to allow the thermoplastic to fully penetrate through and between the interstices of the fibers forming the textile. After an appropriate cooling time, the mold halves are opened and the part is removed from the mold. Because some of the fibers of the textile are interlocked within the thermoplastic, a suitable mechanical bond is achieved when the composite is allowed to cool to its solid state.

Suitable textiles to be used in accordance with the present invention are themselves made in whole or in part, from thermoplastic materials. These can be used in the form of non-woven flat felts or velours, woven textiles, as well as fibers tufted into a thermoplastic primary substrate like loop and cut-pile carpeting.

Virtually all thermoplastic polymers are suitable for use in formation of the parisons of the present invention assuming the required physical properties can be met throughout the process. Examples of suitable thermoplastic polymers that are suitable for use in the present invention are polypropylene, low density polyethylene, high density polyethylene, poly(acrylonitrile-butadiene-styrene), polycarbonate, TPO, TPE.

As noted, the basic process machine that is used herein to conduct the process of the present invention is an extrusion blow molding machine. This could be continuous extrusion type, a reciprocating screw type or an accumulator head type. The mold used is preferably a water cooled mold with appropriate parison pinch-off mechanism and a method of inserting air pressure into the confines of the parison, being a blow channel or blow-pin. Further, the mold should possess the necessary attachment mechanisms with which the textile will be held in place throughout the molding cycle.

In order to disclose more clearly the nature of the present invention, the following examples are presented. It should be understood however, that this is done solely by way of example and is intended neither to delineate the scope of the invention nor limit the ambit of the appended claims.

EXAMPLE 1

Prior to the begining of the blow mold machine cycling, a piece of unbacked non-woven carpet of 6.5 oz/sq. yd. of PET cut to proper size, is placed over one half or both halves of the mold cavity of a Compact Disc Cover mold. A thermoplastic hollow tubular extension ( a parison) is formed by extruding HDPE through a circular die. The parison is suspended vertically between the two mold cavities. When the mold cycles commences, the mold cavities close on the parison until such time as a mechanical device pinch bar at the bottom of the mold cavities will pinch the bottom end of the parison closed. At that time air pressure of about 10 PSI is injected through the blow-pin in the center of the die, such that the parison inflates in the manner of a balloon. The thermoplastic walls are malleable so the parison expands outwardly toward the attached non-woven textile and associated mold cavities. The molten thermoplastic material then contacts the backside of the non-woven carpet transferring some of its heat to the carpet. This heat softens the carpet fibers which in turn allows the carpet to become moldable or malleable.

Simultaneously, the cool surface of the carpet reduces the temperature of the thermoplastic parison. The transfer of heat results in increasing the viscosity of the molten HDPE. This increased viscosity retards the flow of the molten HDPE thus minimizing the penetration of the HDPE which is contacting and surrounding the carpet fibers.

The air pressure was then increased, forcing the parison/carpet composite into the mold cavities where it quickly cooled and solidified into the required shape. The cooled HDPE that has penetrated and wrapped around the fibers of the carpet material also provides a mechanical bond between the carpet and the HDPE.

The part was allowed to cool, the mold opened and the part removed. The flashing was trimmed away and the product was ready for testing.

The product resulting from this process was tested and found to be well in excess of the requirements set forth in the automotive manufacturers specifications for interior and luggage compartment trim.

Thus, while there have been shown and described and pointed out fundamental novel features of the invention as applied to currently preferred embodiments thereof, it will be understood that various omissions and substitutions and changes in the form and details of the method and apparatus illustrated, and in their operation, may be made by those skilled in the art without departing from the spirit of the invention. In addition it is to be understood that the drawings are not necessarily drawn to scale but that they are merely conceptual in nature. It is the intention, therefore, to be limited only as indicated by the scope of the claims appended herewith.

What I claim and desire to protect by Letters Patent is:

1. A method of forming a composite structure combining a textile substrate with a thermoplastic parison, the textile substrate having a front side surface, a back side surface and interstices, the method comprising:

placing the textile substrate between at least two mold halves of an open mold, placing the thermoplastic parison between the mold halves of the open mold, introducing a first application of air pressure into the thermoplastic parison while the thermoplastic parison is in a heated molten condition, to thereby expand the thermoplastic parison against the back side surface and partially into the interstices of the textile substrate to form a combined thermoplastic parison and textile substrate, moving the mold halves to a partially closed position, allowing heat transfer between the combined thermoplastic parison and textile substrate while the mold halves are in the partially closed position thereby cooling the thermoplastic parison to increase the viscosity thereof and prevent complete penetration of the thermoplastic parison through the interstices of the textile substrate, moving the mold halves to fully close the mold around the combined thermoplastic parison and textile substrate, and introducing a second application of air pressure into the combined thermoplastic parison and textile substrate with the closed mold after allowing the heat transfer but while the parison is still heated and formable to further expand the parison and thereby conform the combined thermoplastic parison and textile substrate to the mold.

2. The method of forming the composite structure defined in claim 1, wherein said textile substrate is formed from a thermoplastic material.

3. The method of forming the composite structure defined in claim 1, wherein said textile substrate is formed from one of a non-woven material, a velour material, a woven textile, and a material formed of fibers tufted into a thermoplastic substrate.

4. The method of forming the composite structure defined in claim 3, wherein said textile substrate is a carpet.

5. The method of forming the composite structure defined in claim 3, wherein said parison is formed from a thermoplastic selected from the group consisting of propylene, low density polyethylene, high density polyethylene, poly (acrylonitrile-butadiene-styrene), polycarbonate, TPO or TPE.

6. The method of forming the composite structure defined in claim 5, wherein said second application of air pressure is from about 10 psi to 120 psi.

7. The method of forming the composite structure defined in claim 6, wherein said first application of air pressure is at about 10 psi.

8. The method of forming the composite structure as defined in claim 1, wherein the mold includes two halves.

9. The method of forming the composite structure as defined in claim 1, wherein the mold is a water-cooled mold.

* * * * *

(12) REEXAMINATION CERTIFICATE (4522nd)
United States Patent
Hudkins

(10) Number: US 5,885,515 C1
(45) Certificate Issued: Jan. 15, 2002

(54) BLOW MOLDING PROCESS

(75) Inventor: Patrick E. Hudkins, Carlisle, PA (US)

(73) Assignee: Lear Corporation, Southfield, MI (US)

Reexamination Request:
No. 90/005,784, Aug. 7, 2000

Reexamination Certificate for:
Patent No.: 5,885,515
Issued: Mar. 23, 1999
Appl. No.: 08/812,210
Filed: Mar. 6, 1997

(51) Int. Cl.$^7$ .............................................. B29C 49/20
(52) U.S. Cl. ...................................... 264/516; 264/515
(58) Field of Search ................................ 264/515, 516

(56) References Cited

U.S. PATENT DOCUMENTS

| | | | | |
|---|---|---|---|---|
| 4,289,817 A | * | 9/1981 | Valyi ............................ | 428/35 |
| 4,857,258 A | * | 8/1989 | Le Doux et al. ............ | 264/515 |
| 5,020,687 A | * | 6/1991 | Seizert ......................... | 220/645 |
| 5,040,335 A | * | 8/1991 | Grimes ......................... | 49/502 |
| 5,044,663 A | * | 9/1991 | Seizert ......................... | 280/730 |
| 5,114,522 A | * | 5/1992 | Takado et al. ............... | 156/245 |
| 5,123,688 A | * | 6/1992 | Takado et al. ............... | 293/120 |
| 5,162,092 A | * | 11/1992 | Klobucar et al. ........... | 264/513 |
| 5,169,470 A | * | 12/1992 | Goldberg ................ | 156/244.14 |
| 5,194,212 A | * | 3/1993 | Bonnett ....................... | 264/513 |

FOREIGN PATENT DOCUMENTS

| | | | |
|---|---|---|---|
| JP | 60-262633 | * | 12/1985 |
| JP | 61-227017 | * | 10/1986 |
| JP | 62-4057 | * | 1/1987 |
| JP | 63-92431 | * | 4/1988 |
| JP | 1-34719 | * | 2/1989 |
| JP | 2-47034 | * | 2/1990 |
| JP | 3-69355 | * | 3/1991 |
| WO | WO 94-12334 | * | 6/1994 |
| WO | WO 95-13938 | * | 5/1995 |

* cited by examiner

*Primary Examiner*—Jan H. Silbaugh

(57) ABSTRACT

A process which combines the technologies of extrusion blow molding to form a shaped article and subsequently forming and attaching a textile to the contoured outer surface of the article.

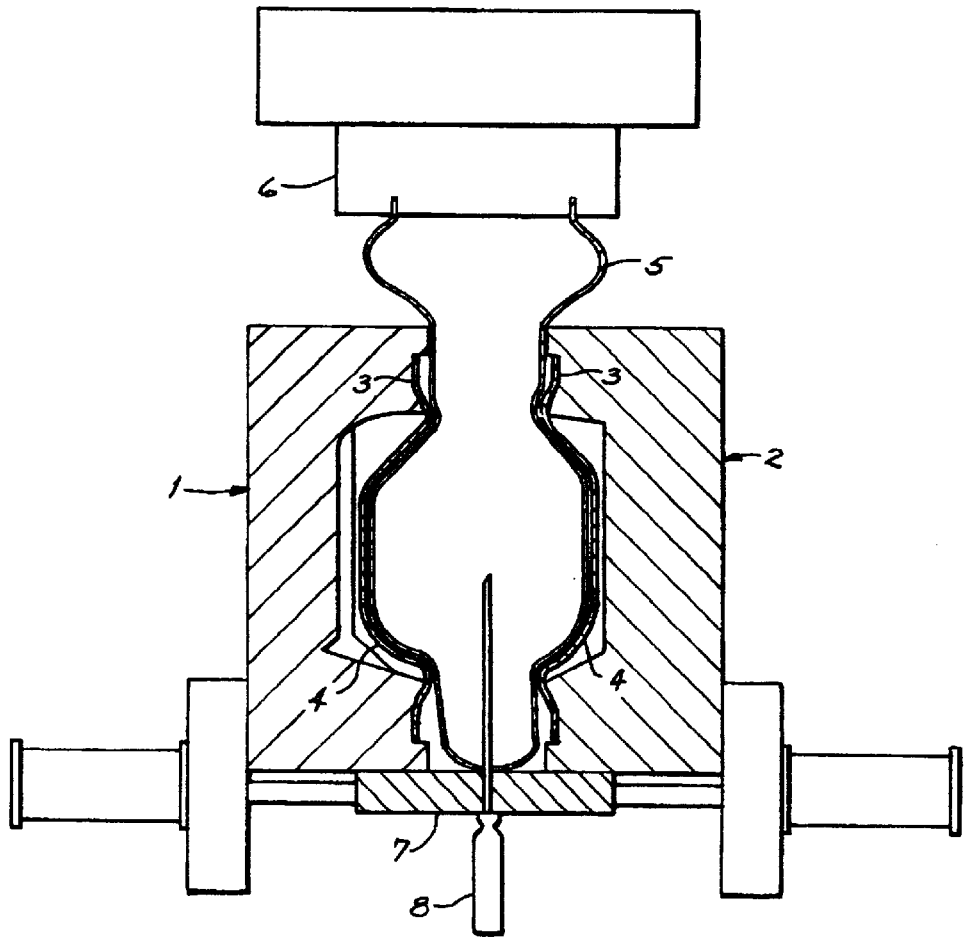

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–9 is confirmed.

\* \* \* \* \*